United States Patent [19]

Kim

[11] Patent Number: 4,580,881
[45] Date of Patent: Apr. 8, 1986

[54] WIDE ANGLE REAR VIEW MIRROR FOR VEHICLES

[76] Inventor: Young S. Kim, 3137 Monticello Dr., Falls Church, Va. 22042

[21] Appl. No.: 599,629

[22] Filed: Apr. 12, 1984

[51] Int. Cl.⁴ ............................................. G02B 5/10
[52] U.S. Cl. .................................... 350/629; 350/584
[58] Field of Search ............... 350/584, 629, 627, 625

[56] References Cited

U.S. PATENT DOCUMENTS

| 2,796,506 | 6/1957 | Lumbert | 350/584 |
| 3,059,540 | 10/1962 | Robinson | 350/584 |
| 3,267,806 | 8/1966 | Azegami | 350/625 |
| 3,764,201 | 10/1973 | Haile | 350/629 |

FOREIGN PATENT DOCUMENTS

| 1035499 | 7/1958 | Fed. Rep. of Germany | 350/584 |
| 1921076 | 11/1970 | Fed. Rep. of Germany | 350/629 |
| 1420532 | 11/1965 | France | 350/629 |
| 1020576 | 2/1966 | United Kingdom | 350/584 |
| 2092534 | 8/1982 | United Kingdom | 350/629 |

Primary Examiner—Jon W. Henry
Attorney, Agent, or Firm—Birch, Stewart, Kolasch Birch

[57] ABSTRACT

A wide angle rear view mirror for vehicles, relatively large trucks, vans and buses, comprised of a mirror surface having a kidney-shaped configuration and forming a single contoured reflective surface and a casing for supporting said mirror surface. The mirror contains structure for directing the air flow created by the motion of the vehicle from the surface of the casing to the surface of the mirror for cleaning the mirror free of dirt, water and the like.

11 Claims, 4 Drawing Figures

WIDE ANGLE REAR VIEW MIRROR FOR VEHICLES

BACKGROUND OF THE INVENTION

The present invention relates to a rear view mirro for vehicles, and more particularly to a rear view mirror which provides a wide angle view from the right side and toward the rear of the vehicle and which substantially reduces or eliminates the blind spot which cannot be imaged by conventional rear view mirrors. The mirror surface itself has a kidney-shaped configuration and forms a single contoured reflective surface while avoiding the use of any generally, spherically shaped reflective surfaces. The mirror of the present invention is also designed so that an air flow is directed across its surface for maintaining the surface free of any debris which would obscure the vision of the viewer.

Rear view mirrors which include generally convex reflective areas have been developed for providing a view which is more extensive than that which can be provided by a flat reflective surface. Such rear view mirrors are shown in U.S. Pat. Nos. 3,375,953, 3,628,851, 3,764,201, 4,012,125 and 4,331,382. However, these mirrors do not provide a full view of the rear and rightside portions of the vehicle and furthermore there is no provision for removing debris such as dirt or rain water from the mirror which frequently occurs during a heavy rain storm. Furthermore, these prior art devices do not substantially eliminate the blind spots normally associated with rear view mirrors and accordingly it is difficult for the driver of the vehicle to clearly observe vehicles approaching from the right, rear side of the vehicle.

SUMMARY AND OBJECT OF THE INVENTION

Accordingly it is a general object of the present invention to provide an improved wide angle rear view mirror.

Another object of the present invention is to provide an improved rear view mirror which is especially structured for mounting to the outside and right side of a vehicle.

A further object of the present invention is to provide an improved rear view mirror having a structure which avoids significant image distortion.

Still another object of the present invention is to provide an improved rear view mirror for use on relatively large trucks, vans and buses which substantially eliminates the blind spot area of the mirror without substantially distorting the image.

Yet another object of the present invention is to provide a rear view mirror which makes effective use of the air flow created by the movement of the vehicle for cleaning the mirror free of dirt, water and the like.

A further object of the present invention allows the mirror to be readily replaced in the event that it is damaged.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

These and other problems and disadvantages associated with the prior art are overcome by the present invention which provides a mirror having a kidney-shaped configuration and having a contoured, wide angle reflective surface so that the driver of the vehicle can continuously observe an approaching vehicle from the right, rear side thereof until it reaches the peripheral vision of the driver, with a minimum amount of distortion. Also, the unique structure of the mirror makes effective use of the air flow caused by the motion of the vehicle for cleanig the surface of the mirror free from rain water, dirt or the like.

Briefly described, the present invention provides a wide angle rear and right side rear view mirror having a single contoured surface with a kidney-shaped configuration, wherein in the horizontal plane the lower left portion of the surface is more convex than the lower right portion thereof; in the vertical plane the upper left portion of the surface is less convex than the lower left portion thereof and in the vertical and horizontal planes the upper right portion of the surface has the same convex shape as the lower right portion thereof. The head portion of the mirror arrangement is provided with an aperture for directing ram air created by the motion of the vehicle across the surface of the mirror.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE DRAWINGS

Figure 1:
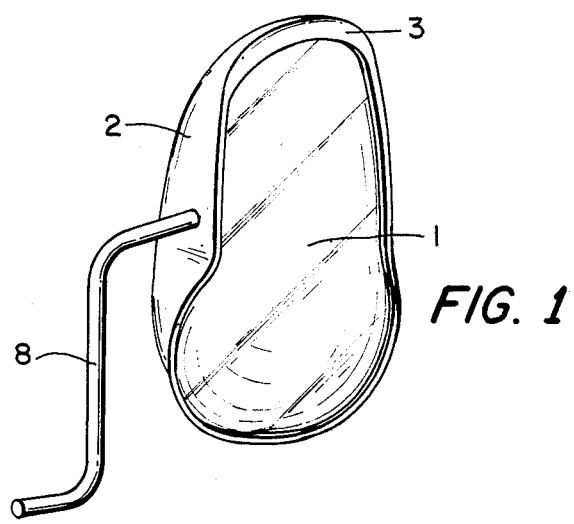
FIG. 1 is a front perspective view of the rear view mirror of the present invention.
Figure 2:
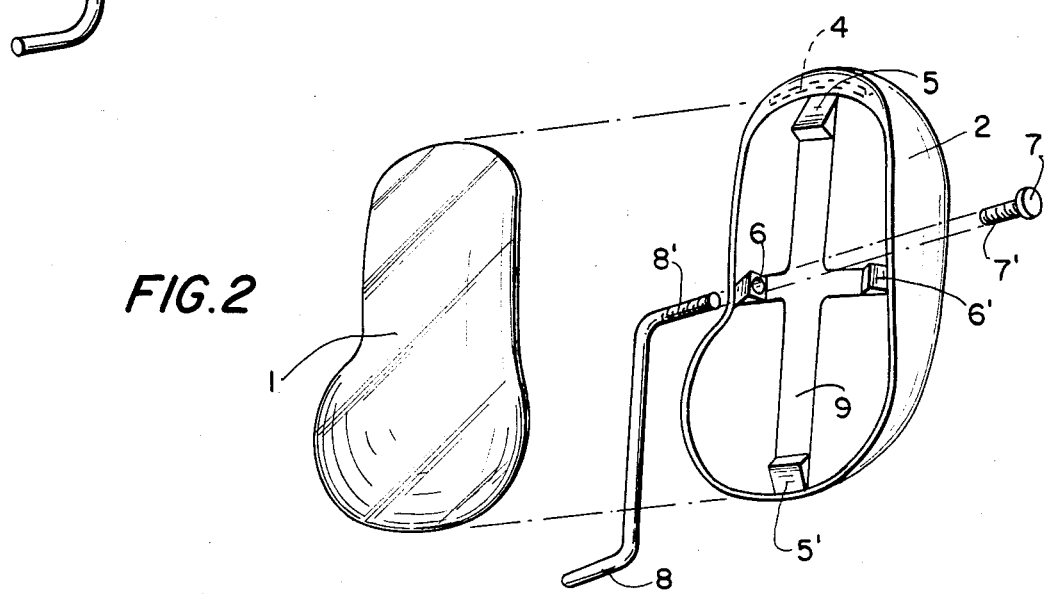
FIG. 2 is an exploded view showing the basic components of the mirror according to the present invention.

Referring now in detail to the drawings for the purpose of illustrating the present invention, the wide angle rear view mirror as shown in FIG. 1 comprises a reflective surface 1 (mirror) having a kidney-shaped configuration of FIG. 1. The mirror is mounted in a casing 2. The kidney-shaped mirror 1 has a single contoured surface wherein, in the horizontal plane, the lower left portion of the mirror surface, facing the mirror is more convex for example, has a smaller radius of curvature than the lower right portion thereof and wherein, in the vertical plane, the upper left portion of the mirror surface is less convex for example, has a greater radius of curvature than the lower left portion thereof and, in the vertical and horizontal planes, the upper right portion of the mirror surface has substantially the same convex shape as the lower right portion thereof.

Figure 3:
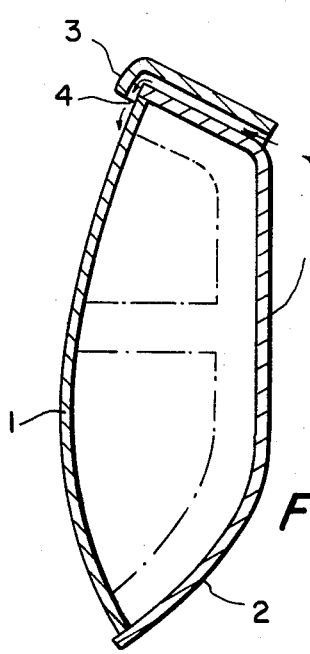
FIG. 3 is a sectional view of the rear view mirror showing one embodiment of the structure for directing the air flow across the surface of the mirror according to the present invention.
Figure 4:
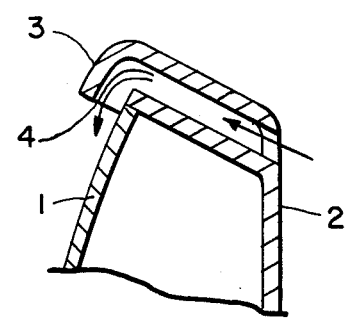
FIG. 4 is a sectional view of the rear view mirror showing another embodiment of the structure for directing the air flow across the surface of the mirror according to the present invention.

The casing 2 has a rear triangular shape which is designed to minimize wind resistance caused by the movement of the vehicle. The casing is provided with an internal structure for facilitating the mounting of the mirror to the casing. This internal structure includes a cross-shaped supporting member 9 having raised portions 5, 5', and 6, 6' to which the mirror is attached. A connecting hole 6 is provided in the raised portion to enable the mounting arm 8 with its internally threaded end portion 8' to be secured to the internal structure by bolt 7 having an externally threaded portion 7'. The upper portion of the casing is provided with a slot for collecting the air flow created by the motion of the vehicle and channeling this air flow through the casing and across the surface of the mirror. Thus the air enters the casing as shown by the arrow and is redirected by lip 3 in the downward direction across the surface of the mirror. Element 4 represents the slot through which the air is flowing. The air channel can be designed as part of the casing as shown in FIG. 4 or alternatively, a separate element can be welded to the top of the casing as shown in FIG. 3 to achieve the same effect. The slot advantageously extends across the rear of the casing and can be partitioned into a plurality of apertures.

The mirror arrangement of the present invention can be mounted in a known manner to either the left or right side of the vehicle. If mounted on the left side of the vehicle the mirror should have a flat surface.

The rear view mirror of the present invention can be made of any type of materials. For example, the casing and internal structure can be made of either a plastic or metallic material.

The invention being thus described, it will be obvious that the same may be varied in many ways. Such variations are not to be regarded as a departure from the spirit and scope of the invention, and all such modifications as would be obvious to one skilled in the art are intended to be included with the scope of the following claims.

What is claimed is:

1. A wide angle rear view mirror for use on vehicles comprising:

a mirror having a single contour surface and wherein, in the horizontal plane, the lower left portion of the mirror surface has a smaller radius of curvature than the lower right portion thereof and wherein, in the vertical plane, the upper left portion of the mirror surface has a greater radius of curvature than the lower left portion thereof and, in the vertical and horizontal planes, the upper right portion of the mirror surface has substantially the same convex shape as the lower right portion thereof whereby the blind spot area of the mirror is substantially eliminated without substantially distorting the image, and a casing for supporting said mirror surface, said casing provided with a means for directing the air flow created by the motion of the vehicle from the surface of the casing to the surface of the mirror whereby said mirror surface is continually provided with a stream of air across its surface.

2. The wide angle rear view mirror of claim 1 wherein the upper rear side portion of the casing is provided with a slot for receiving the air flow and the upper front side portion of the casing is provided with a lip portion which extends a distance along the surface of the mirror for directing the air flow from the top to the bottom thereof.

3. The wide angle rear view mirror of claim 2 wherein the slot forms part of the casing.

4. The wide angle rear view mirror of claim 2 wherein a member is added to the top of the casing to form said slot.

5. The wide angle rear view mirror of claim 1 wherein the mirror has a single contoured surface with a kidney-shaped configuration.

6. The wide angle rear view mirror of claim 1 wherein the casing has a shape which is complementary to that of the mirror to facilitate the attachment of the mirror to the casing.

7. The wide angle rear view mirror of claim 3 wherein the slot is subdivided into a plurality of apertures.

8. The wide angle rear view mirror of claim 1 wherein the casing is provided with a cross-shaped internal structure which contains raised surfaces at the end portions thereof for attachment of the mirror surface thereto.

9. The wide angle rear view mirror of claim 8 wherein the casing is provided with a connecting hole which is disposed in the raised portion to enable a mounting arm containing an internally threaded end portion to be secured to the internal structure by a bolt having an externally threaded portion.

10. A wide angle rear view mirror having a single contoured surface wherein, in the horizontal plane, the lower left portion of the mirror surface has a smaller radius of curvature than the lower right portion thereof and wherein, in the vertical plane, the upper left portion of the mirror surface has a greater radius of curvature than the lower left portion thereof and, in the vertical and horizontal planes, the upper right portion of the mirror surface has substantially the same convex shape as the lower right portion thereof.

11. The wide angle rear view mirror of claim 6 having a kidney-shaped configuration.

* * * * *